United States Patent [19]

Farkas

[11] Patent Number: 6,025,402
[45] Date of Patent: Feb. 15, 2000

[54] CHEMICAL COMPOSITION FOR EFFECTUATING A REDUCTION OF VISIBILITY OBSCURATION, AND A DETOXIFIXATION OF FUMES AND CHEMICAL FOGS IN SPACES OF FIRE ORIGIN

[75] Inventor: Gabriel J. Farkas, 9843 Forbes Ave., Northridge, Calif. 91343

[73] Assignee: Gabriel J. Farkas, Northridge, Calif.

[21] Appl. No.: 09/166,769

[22] Filed: Oct. 5, 1998

[51] Int. Cl.⁷ .............................. C09K 3/22; B01D 45/00; A01G 15/00
[52] U.S. Cl. ................................. 516/114; 516/7; 252/2; 239/2.1; 239/14.1
[58] Field of Search .................................. 516/114, 7, 8, 516/8.1; 239/2.1, 14.1; 252/2; 95/152, 116; 502/35, 225, 314

[56] References Cited

U.S. PATENT DOCUMENTS

| | | | |
|---|---|---|---|
| 3,056,556 | 10/1962 | Sanger et al. | 239/2.1 |
| 3,877,642 | 4/1975 | Vonnegut et al. | 239/2.1 |
| 3,915,379 | 10/1975 | Burkardt et al. | 239/2.1 |
| 4,226,600 | 10/1980 | Seidenberger | 436/73 |
| 5,360,162 | 11/1994 | Mentus | 239/2.1 |

*Primary Examiner*—Richard D. Lovering
*Assistant Examiner*—Daniel S. Metzmaier

[57] ABSTRACT

A chemical composition is disclosed herein for effectuating a complex detoxification of fumes, chemical fogs, and a reduction of visibility obscuration caused by fumes and dispersed extinguishing agents in confined areas of fire origin.

The composition includes four solid, crystalline components: two chemical nucleators for cooling and rapid condensation of water vapors, two oxides for converting carbon monoxide to carbon dioxide; and includes two clathrates in aqueous solution, for inclusion complexation of primary toxic gases and components of the dispersion mediums in smokes, and dispersed phase in the water vapors.

9 Claims, No Drawings

CHEMICAL COMPOSITION FOR EFFECTUATING A REDUCTION OF VISIBILITY OBSCURATION, AND A DETOXIFIXATION OF FUMES AND CHEMICAL FOGS IN SPACES OF FIRE ORIGIN

BACKGROUND OF THE INVENTION

The present invention relates to chemical enhancement of visibility and neutralization of airborne toxic substances in spaces of fire origin, saturated with smokes, water vapors and chemical fogs.

BRIEF DESCRIPTION OF THE PRIOR ART

In spaces of fire origin, enclosed by walls or separated from other similar spaces by walls or partitions, it can be expected that the air will be nearly, if not totally saturated with fumes, water vapors, and dispersed fire extinguishing agents. The visibility in these areas is reduced to less than 1 meter. The visibility obscuration caused by these disperse systems prevents escape activities, and this restriction is crucial for rescuing individuals disabled by injuries and/or smoke inhalation, and trapped in spaces of fire origin. Due to reduced visibility and high toxicity of smokes, only the firefighters equipped with special vision devices and autonom air supply, are able to access the areas of fire origin. Firefighters install blowers for rarefying fumes, vapors and fogs. The positive pressure induced by the forced airmovement may increase the density of the airborne systems, the visibility obscuration caused by these systems, and may worsen the breathing conditions for entrapped victims.

OBJECTS AND ADVANTAGES

Accordingly, several objects and advantages of the present invention are (a) to provide an emergency aid for persons found in immediate vicinity of the spaces of fire origin, but not having special protective equipment, to access these area;

(b) to improve the conditions of visibility in the spaces of fire origin;

(c) to detoxify smokes, fumes, and fogs;

(d) to provide an emergency alternative to the special vision devices in spaces of fire origin, and;

(e) to neutralize the toxic carbon monoxide in smokes, fumes in spaces of fire origin.

SUMMARY OF THE INVENTION

The present invention provides a chemical composition which rapidly condensates water vapors simultaneously produced with smokes, and/or by vaporization of water, or solutions with high content of water. The composition converts carbon monoxide to carbon dioxide. The composition also encapsulates airborne chemical substances in smokes, fumes, and components of the dispersion medium of these colloidal systems, and alterates their chemical and physical properties by molecular inclusion. Fires are divided into four classes, each requiring special treatment. Class A includes fires in combustible materials, where the suppressing and cooling effect of water, or of solutions with high content of water is of first importance. Class B includes fires in flammable liquids. Fire foams used primarily on fires of Class B, besides of the foaming agent, contain stabilizing agents, such as soaps, proteins, fatty acids, sulfites, and alkyl sulfonates. Class D includes fires in metals, and the most frequently used fire extinguishing agent is trimethoxyboroxine. Therefore, in the spaces of fire origin, enclosed by walls or separated from similar spaces by walls or partitions, it can be expected that the air will be nearly, if not totally saturated with fumes, water vapors, and fire foams. All foaming and stabilizing agents used on different classes of fires do form a colloidal suspension in water vapors and fumes. Fumes, chemical fogs, and water vapors form an opac colloidal system, which causes a severe visibility obscuration and airborne toxic contamination in spaces of fire origin.

Therefore, it is among the primary objects of the present invention to provide a novel, fast acting agent for reducing the visibility obscuration in spaces of fire origin.

Another object of present invention to provide a fast reacting neutralizer for primary toxic gases in smokes and chemical fogs.

Another object of present invention to provide a fast reacting neutralizer for the dispersion medium of the colloidal systems in spaces of fire origin.

Yet another object of the present invention is to provide a fast acting agent for reducing the density of chemical fogs in spaces of fire origin.

DESCRIPTION OF THE PREFERRED COMPOSITION

The composition/formulation of the present invention which is believed to be novel is set forth with particularity in the appended claims. The present invention, both as to its organization and manner of operation, together with further objects and advantages thereof, may best be understood with reference to the following description.

Firstly, a saline aqueous solution (with 0.1–0.3% of sodium chloride) of alpha- and beta-cyclodextrins (CDs) is used for fixation of water vapors and for molecular inclusion complexation of primary toxic gases in smokes. Sodium chloride enhances the complexation activity of the beta-cyclodextrin. Fixation of vapors by CDs solution is followed by continuous regeneration. The aqueous phase will saturate with CDs, the guest molecules will complex with CDs in droplets of water, and as the CD complex saturates the water phase, the complex will crystallize or precipitate out of the aqueous phase. Alpha- and beta-cyclodextrins are cyclic oligosaccharides built up from six, respectively seven glucopyranose rings. The glucose building units are locked into conical molecular capsules with a hollow cavity of specific volume. The inside diameter of the cavity is 5.7 angstroms for alpha-, and 7.8 angstroms for beta-CD. The lining of the cavity consists of glucosidic oxygen bridges. This conical molecular structure with central cavity of the CDs will form three-dimensional inclusion complexes with a wide variety of suitable sized "guest" molecules. In the case of some low molecular weight molecules more than one guest molecule may fit into the cavity. In the case of some high molecular weight molecules more than one CD molecule might bind to the guest. Only a portion of the guest molecule must fit into the cavity to form a complex which is the case with many high molecular weight molecules. The potential guest list for molecular inclusion includes aliphatics, aldehydes, organic acids, oxy-acids, fatty acids, gases, halogen anions and halogenated compounds.

Afterward, a mixture of cobaltic-cobaltous oxide, cuprous oxide, silver iodide (AgI) and cuprous iodide (CuI) is employed for converting carbon monoxide to carbon dioxide, for rapid nucleation and ice-nucleation of water vapors, and for reducing the density of chemical fogs in spaces of fire origin. The cobaltic-cobaltous oxide is readily reduced by carbon monoxide. This oxide is a black or gray crystalline powder. The cuprous oxide is used as a catalyst for converting carbon monoxide to carbon dioxide. It is a yellow, red or brown powder. Condensation of water vapors is facilitated by the presence of AgI crystals the surfaces of which are wetted by the vapors. These crystals adsorb a thin film of vapor upon their surface and thus behave as droplets of equal size, so that they present ready-made aggregates which serve as nucleus for condensation. AgI is a light yellow powder, crystals are hexagonal or cubic. Below 137 C. it is in cold cubic, or gamma form.

CuI, a dense powder or cubic crystals, is employed as ice-nucleating agent for low volatile droplets of water which are remaining dispersed in different gases in smokes, and are creating chemical nuclei for fog formation.

The particular formulation of the said composition is the following:

A. Dry spray:
1. Cobaltic-cobaltous oxide
2. Cuprous oxide
3. Silver iodide
4. Cuprous iodide
5. Propellant—air or carbon dioxide.

B. Liquid spray:
1. Beta-cyclodextrin 1.85 g
2. Alpha-cyclodextrin 13.0 g
3. Sodium chloride 0.1–0.3 g
4. Distilled water 100.0 ml
5. Propellant—air or carbon dioxide.

What is claimed is:

1. A dry spray formulation comprising silver iodide, copper iodide, cobalt-cobaltous oxide, cuprous oxide and a propellant; said propellant is air or carbon dioxide; wherein said iodides act as ice and water vapor nucleating agents and said oxides act as carbon monoxide reducing agents when sprayed to reduce the visibility obscuration caused by smokes, vapors, fumes, and fogs.

2. The formulation according to claim 1, further comprising as a separate liquid spray formulation usable with said dry spray formulation; said liquid spray formulation comprising an aqueous solution of $\alpha$- and $\beta$-cyclodextrins.

3. The formulation according to claim 2, wherein $\alpha$-cyclodextrin is in an amount of 1.85% by weight of solution and $\beta$-cyclodextrin is in an amount of 13.0% by weight of solution.

4. The formulation according to claim 2, wherein said liquid spray formulation further comprises sodium chloride.

5. The formulation according to claim 4, wherein the sodium chloride is in an amount of 0.1 to 0.3% by weight of solution.

6. A method for reducing the visibility obscuration caused by smokes, vapors, fumes, and fogs comprising spraying a liquid spray formulation comprising an aqueous solution of $\alpha$- and $\beta$-cyclodextrins followed by spraying a dry spray formulation comprising silver iodide, copper iodide, cobalt-cobaltous oxide, cuprous oxide and a propellant; said propellant is air or carbon dioxide; wherein said iodides act as ice and water vapor nucleating agents and said oxides act as carbon monoxide reducing agents when sprayed to reduce the visibility obscuration caused by smokes, vapors, fumes, and fogs.

7. The method according to claim 6, wherein $\alpha$-cyclodextrin is in an amount of 1.85% by weight of solution and $\beta$-cyclodextrin is in an amount of 13.0% by weight of solution.

8. The method according to claim 6, wherein said liquid spray formulation further comprises sodium chloride.

9. The method according to claim 8, wherein the sodium chloride is in an amount of 0.1 to 0.3% by weight of solution.

* * * * *